United States Patent [19]
Harkness et al.

[11] 3,902,301
[45] Sept. 2, 1975

[54] ARTICLE PACKAGING MACHINE
[75] Inventors: Kenneth A. Harkness; D. Mark Kettunen, both of Columbus, Ohio
[73] Assignee: Kenneth A. Harkness, IDEAnamics, Columbus, Ohio
[22] Filed: Apr. 23, 1973
[21] Appl. No.: 353,459

[52] U.S. Cl. .................. 53/75; 53/182; 53/184
[51] Int. Cl. .................. B65b 9/12; B65b 61/10
[58] Field of Search ......... 53/182, 184, 76, 75, 373, 53/282, 389, 180; 198/195, 196, 198, 199, 197; 221/79, 81, 87; 156/515, 251

[56] References Cited
UNITED STATES PATENTS

| | | | |
|---|---|---|---|
| 2,649,954 | 8/1953 | Nawman | 198/198 |
| 2,828,825 | 4/1958 | Johnson | 198/196 S |
| 2,931,148 | 4/1960 | Smith | 53/182 X |
| 2,976,657 | 3/1961 | Cloud | 53/182 X |
| 3,197,013 | 7/1965 | Van Der Winden | 198/167 X |
| 3,295,290 | 1/1967 | Billingsley et al. | 53/182 X |
| 3,340,996 | 9/1967 | Cerf | 53/180 X |
| 3,342,306 | 9/1967 | Fabbri | 53/182 X |
| 3,447,284 | 6/1969 | Sparks et al. | 53/373 X |
| 3,473,288 | 10/1969 | Nakamura et al. | 53/182 X |
| 3,503,175 | 3/1970 | Marasso et al. | 53/182 X |
| 3,534,393 | 10/1970 | Bickham et al. | 53/184 X |
| 3,590,552 | 7/1971 | Marschke | 53/389 X |
| 3,590,973 | 7/1971 | Sorensen | 53/282 X |
| 3,619,910 | 11/1971 | Carmichael | 53/184 X |
| 3,706,183 | 12/1972 | Talarico | 53/282 X |

Primary Examiner—Robert L. Spruill
Assistant Examiner—Horace M. Culver
Attorney, Agent, or Firm—Frank H. Foster

[57] ABSTRACT

A machine for automatically wrapping retail quantities of produce and the like in a tight, durable, heat shrinkable plastic film package. An endless conveyer has spaced, laterally aligned and detachably mounted fences forming loading zones of selectable sizes and is trough shaped and longitudinally inclined to gather or bunch the produce together. A film supply means feeds film ribbons beneath and over the produce. A welding and severing means, including a slide-mounted parallelogram drive link mechanism, welds and severs the ribbons between the loading zones of the continuously travelling conveyor. The welding and severing means is actuated by a cam follower operated switch which is tripped by the lateral fence members. Film is shrunk in a heat shrink tunnel featuring heaters mounted in the tunnel beneath the conveyor and an impeller mounted in the tunnel above the conveyor for circulating the heated air. A discharge lift assists package transfer from the conveyor.

10 Claims, 14 Drawing Figures

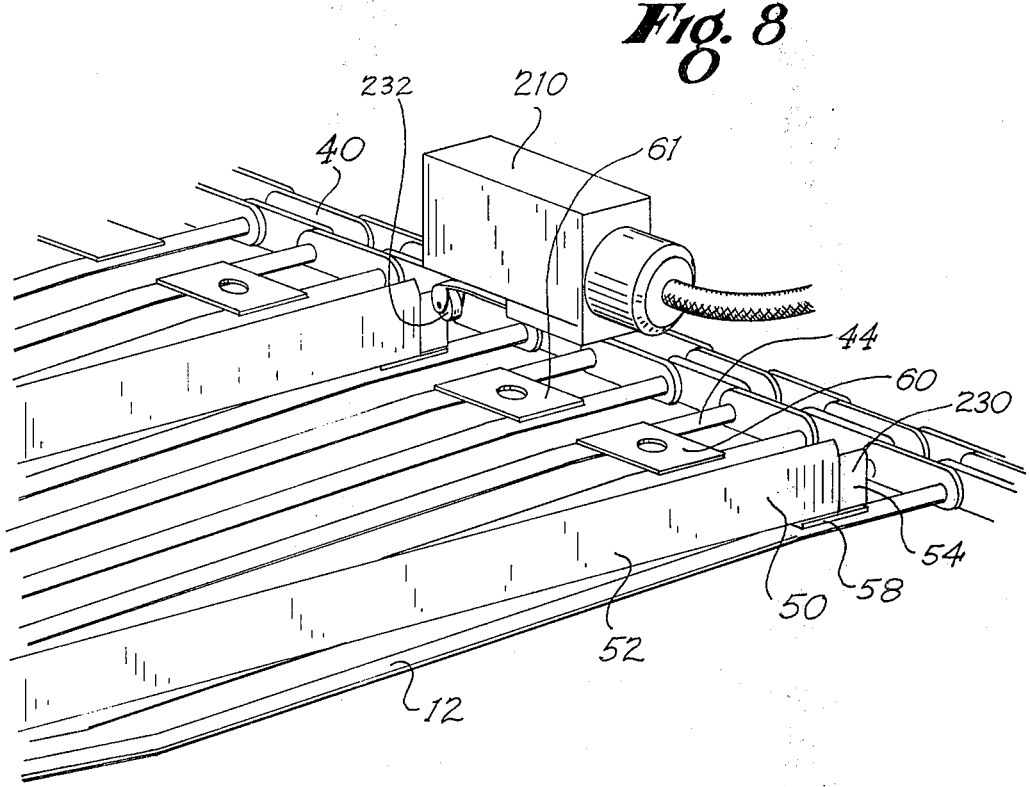
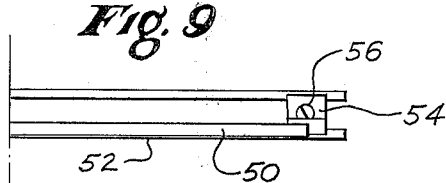
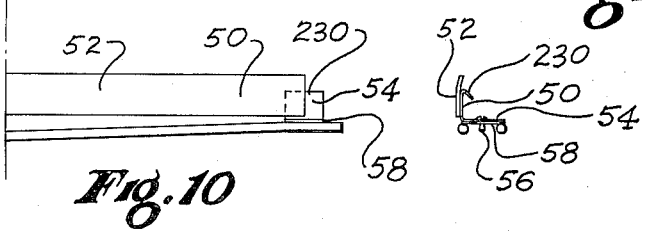

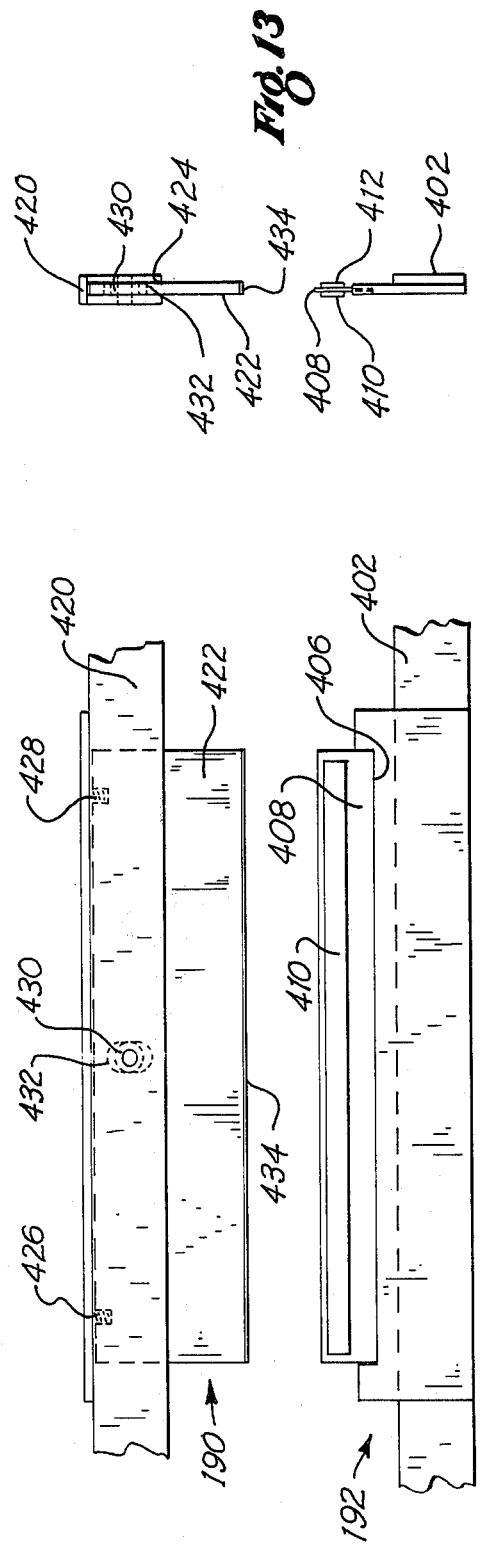

ARTICLE PACKAGING MACHINE

BACKGROUND

The invention relates generally to a machine for automatically packaging articles in heat shrinkable plastic film and more particularly relates to a continuously operating machine capable of improved packaging rates for protectively packaging produce and the like.

In many food packaging operations, especially in grocery supermarkets, produce such as oranges, grapefruits, apples and many other produce articles are received in bulk quantities packaged only in crates or cartons. They are repackaged in convenient retail quantities such as two, four, six or a dozen articles depending upon the type of produce being packaged. Quality wrapping improves sales displays, reduces customer sorting making sales more profitable. As in other packaging operations, it is economically important that these articles be packaged as quickly as possible with the minimum aid of human labor. It is similarly important that the packages aid in the preservation of quality fresh produce so that the produce remains attractive over a long shelf life.

Most produce is currently hand-wrapped. Such hand-wrapping necessitates the use of paper or plastic trays to position and hold items during wrapping. These trays add to the cost of the package yet are disposed of when a shopper gets home because they are of no use or value. Trays also require warehouse space in the store, and they contribute to solid-waste disposal problems in the home. In fact, trays actually are of negative value in produce sales, since they reduce the customer's view of the product. These are municipal, state and federal regulations which will require full visibility of wrapped produced and meat from all sides of the package.

Since tray use contributes nothing except to the wrapping operation, their use represents a waste of valuable natural resources. Where trays are used, the size of the produce packages are limited to standard tray dimensions. The more sizes a supermarket wants, the greater are the inventory and handling problems in the store. There is therefore a need for a machine which matches package size to produce sizes, rather than vice-versa.

Hand-wrapping (as well as machine wrapping with machines now available to wrap produce) is done with a lap splice of film under the tray. Also the ends of the film are tucked under the tray. This results in a waste of plastic film.

Additionally, even if the trays are of clear plastic, the several folded and twisted layers of film under the tray destroy visibility through the bottom of the tray.

Many types of packaging machines are shown in the art, such as the machine disclosed by L. Cerf in U.S. Pat. No. 3,340,996.

In the conventional type of machine an endless conveyer is manually loaded with produce at one end. As the produce travels along with the conveyer, it is treated at various stages of the packaging machine until the packaged produce is emitted from the opposite end of the machine.

There are many operating characteristics of such prior art packaging machines which need improvement and consequently it is an object of the present invention to optimize these operating characteristics.

For example, it is desirable that the produce be positioned as closely together as practical during the packaging operation in order to result in compact, uniform packages of neat appearances. The position of the produce is often a function both of the position in which the produce is initially laid by the individual loading the machine and by any tendency of the machine to move the produce during the processing operations. It is therefore an object of the present invention to minimize the human effort needed in positioning the produce and to have the machine function to gather or bunch the produce together and hold it together during the packaging operation.

Many types of packaging machines require an intermittent operation. The conveyer must be stopped for completing the treatment steps performed by the machine. This is especially true for the welding operation in which two members, one positioned above the conveyer and one positioned below it, must come together to weld the film ribbons. Another object of the present invention is to provide a packaging machine which operates entirely continuously without any intermittent stops and yet performs all the necessary treatment of the packages.

Still another object of the invention is to provide a continuous machine which can be operated at variable speeds in order to accommodate the requirements of different produce and the capabilities of different persons who are loading the machine.

Another object of the invention is to provide a machine which is effective with or without the use of packaging trays without requiring special modifications to accommodate trays.

Yet another object of the invention is to eliminate the use of a tray and thereby eliminate this resource consumption.

Another problem often encountered with packaging machines results from the fact that the film which is most suitable for packaging produce is difficult to handle. It has high electrostatic characteristics and consequently is strongly attracted to itself and to parts of the packaging machine often causing snaps, bunching and faulty feeding of the film. This film also exhibits the property that tears, once initiated, migrate very easily and quickly through the material. Consequently, another object of the invention is to provide a film feed mechanism which can pull the film from a supply roll and feed it to the produce packages effectively and without tearing or elecrostatic adherence.

Still another object of the invention is to provide a produce packaging machine which will tightly wrap a minimum quantity of film around the grouped produce regardless of the size of the grouping and without requiring any special adjustment or positioning of the lateral fences which define the multiple loading zones. Thus, it is an object of the invention to conserve resources by utilizing a minimum of film on a package even when the entire loading zone is not filled by articles to be packaged. Further, it is an object of this invention to be able to accommodate a practically infinite combination of package sizes within a very broad size range.

Other packaging machines have exhibited problems in suitably and evenly shrinking the film around the produce. Special problems have occurred with regard to shrinking the bottom portion of the package. It is therefore another object of the invention to provide a heat shrink tunnel apparatus which evenly heats the plastic film around the produce in order to avoid uneven shrinking between the bottom and other parts of the package. A further object is to provide an apparatus which very rapidly applies heat to the film in order to avoid the detrimental heat shrinking effect of the fruit upon the film.

Further objects and features of the invention will be apparent from the following specification and claims when considered in connection with the accompanying drawings illustrating the preferred embodiment of the invention.

SUMMARY

The invention is an article packaging machine having a support frame and motor drive, endless, article conveyer means with an article loading station and a package emitting end downstream thereof. A heat shrinkable packaging film supply means is also mounted to the support frame and includes both upper and lower film supply rolls for feeding a lower ribbon of film onto the end of the conveyer in a downstream direction and another upper ribbon onto the lower film ribbon downstream of the loading station. A film welding and severing means is mounted to the frame for laterally bonding the upper and lower film ribbons for laterally severing the ribbons intermediate the bond. A heat shrink means is mounted to the frame downstream of the welding means for heat shrinking the film around the articles.

DESCRIPTION OF THE DRAWINGS

FIG. 8 is a view in perspective of the cam operated switch mechanism and its operative cooperation with the fence members of the preferred embodiment of the invention.

FIG. 9 is a plan view of a portion of the fence members illustrated in FIG. 8.

FIG. 10 is a front elevational view of the fence members illustrated in FIG. 9.

FIG. 11 is a side elevational view of the fence members illustrated in FIG. 10.

FIG. 12 is a front elevational view illustrating the details of the preferred welding and severing means.

FIG. 13 is a side elevational view of the welding and severing means of FIG. 12.

Figure 1:
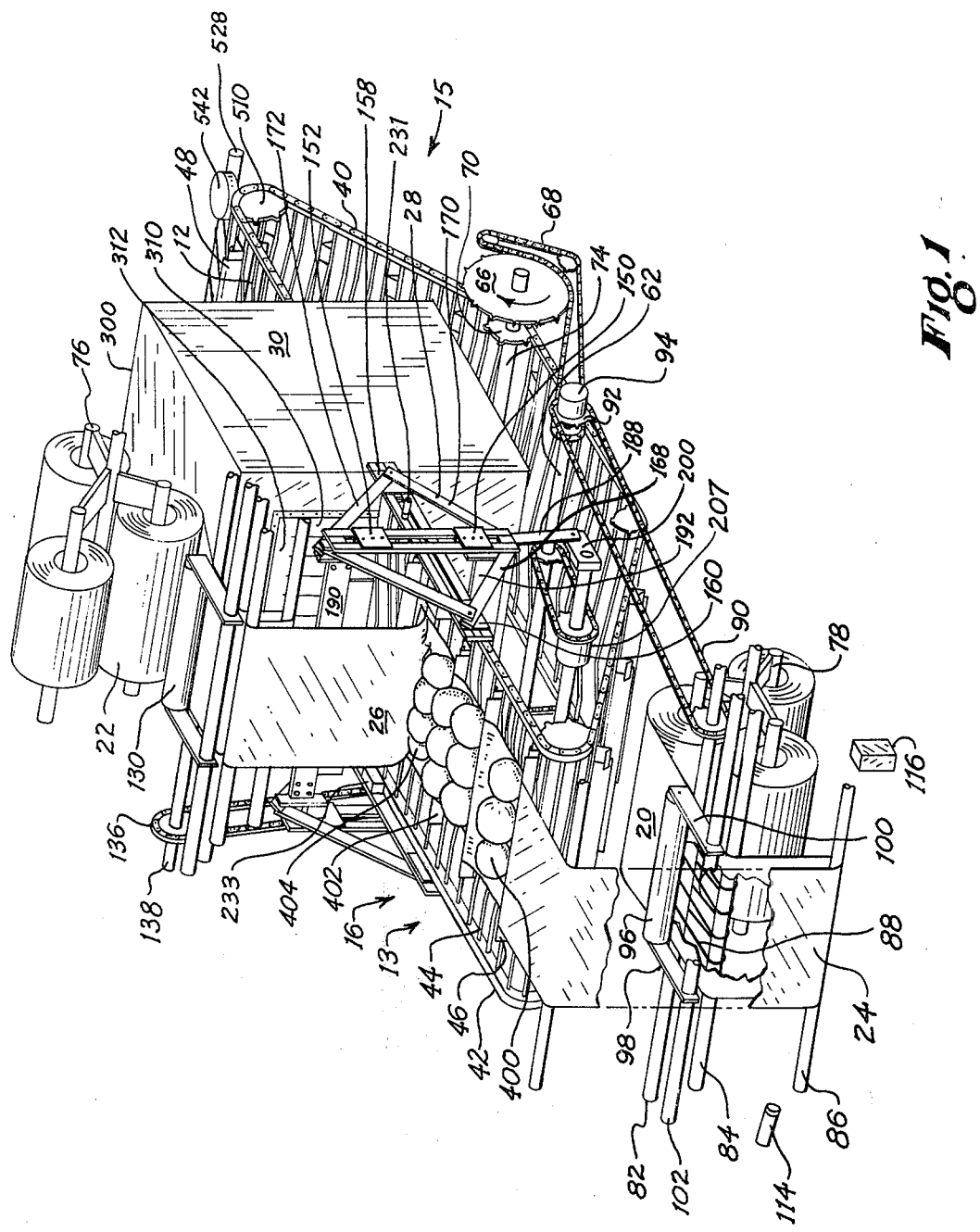
FIG. 1 is a view in perspective of the interior working mechanisms of the invention with the frame and cabinet removed.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operaate in a similar manner to accomplish a similar purpose.

DETAILED DESCRIPTION

Referring to the FIGURES, the preferred embodiment of the invention may be generally described as having a support frame 10 on which the working mechanisms are supported. The support frame 10 is formed of rectangular tubular steel with butt welded joints and on which panel members are fastened for concealing and protecting the working mechanisms. These panels however, are not shown in order to illustrate the working mechanism of the invention.

An endless article conveyer means 12 is mounted to the support frame 10 and driven by a variable speed motor 14. The conveyer means 12 has an upper treatment portion 13 and a lower return portion 15 and further has an article loading station 16 at one end and a package emitting end 18 downstream thereof.

A heat shrinkable packaging film supply means is mounted to the support frame and includes a lower film supply roll 20 and an upper film supply roll 22. The lower film supply roll 20 feeds a lower film ribbon 24 onto the end of the conveyer nearest the loading station 16 and in a downstream direction. The upper film supply roll 22 feeds an upper film ribbon 26 downwardly onto the lower film ribbon 24 downstream of the loading station 16. A film welding and severing means 28 is mounted to the support frame 10 adjacent the upper treatment portion 13 of the conveyer 12 downstream of the upper film ribbon 26. The welding and severing means 28 laterally bonds the upper film ribbon 26 and the lower film ribbon 24 together and laterally severs the ribbons intermediate the bond.

An enclosured heat shrink means 30 is mounted to the frame 10 adjacent the upper treatment portion of the conveyer and downstream of the welding and severing means 38 for heat shrinking the film around the articles as the articles pass through the heat shrink means 30 on the moving conveyer means 12.

Examination may now be made into the detailed structure of the preferred embodiment of the invention.

The conveyer comprises a pair of spaced, parallel, synchronously driven, longitudinal dirve chains 40 and 42 joined by a plurality of lateral rods 44 at spaced intervals along the conveyer 12. Each of the lateral rods 44 is bent inwardly of the conveyer in order to form a centrally tapering, longitudinal trough along the conveyer. The conveyer 12 has a plurality of outwardly extending, lateral fences such as fences 46 and 48 (at opposite ends of the machine). These lateral fences are spaced along the conveyer to form a series of loading zones.

The preferred lateral fences are detachably mounted to the conveyer so that they may be conveniently, manually removed and positioned at various selectable positions along the conveyer. The packaging apparatus, therefore, may be quickly and easily modified to accommodate produce groupings which may be desired for various types of produce and various package sizes. The detailed structure of these detachably mounted fences is illustrated more clearly in FIGS. 8–11. For example, the fence 50, comprises a relatively rigid fence member 52 having an angle bracket, such as bracket 54, welded to each of its ends and extending outwardly therefrom. Each of the angle brackets has a first, manually operable fastener member such as fastener member 56 extending therefrom. A plurality of cooperating, laterally aligned, second fastener members, to which the first fastener members are attachable, are spot welded near opposite ends of the lateral rods at spaced positions along the conveyer. For example, the fence 56 is removably attachable to the second fastener 58. The cooperating fasteners are preferably standard quarter turn fasteners which are matingly alignable and engageable permitting the detachable fastening of the fences at the selected positions along the conveyer 12. For example, FIG. 8 also illustrates second fastener members 60 and 61 at which fence members could alternatively be attached.

Preferably, the fastener members are prefabricated in units with a pair of fastener members welded to join opposite ends of a pair of lateral rods. The fastener members spanning pairs of adjacent lateral rods serve also to prevent any rotation of the lateral rods and consequent distortion of the longitudinal trough.

Figure 2:
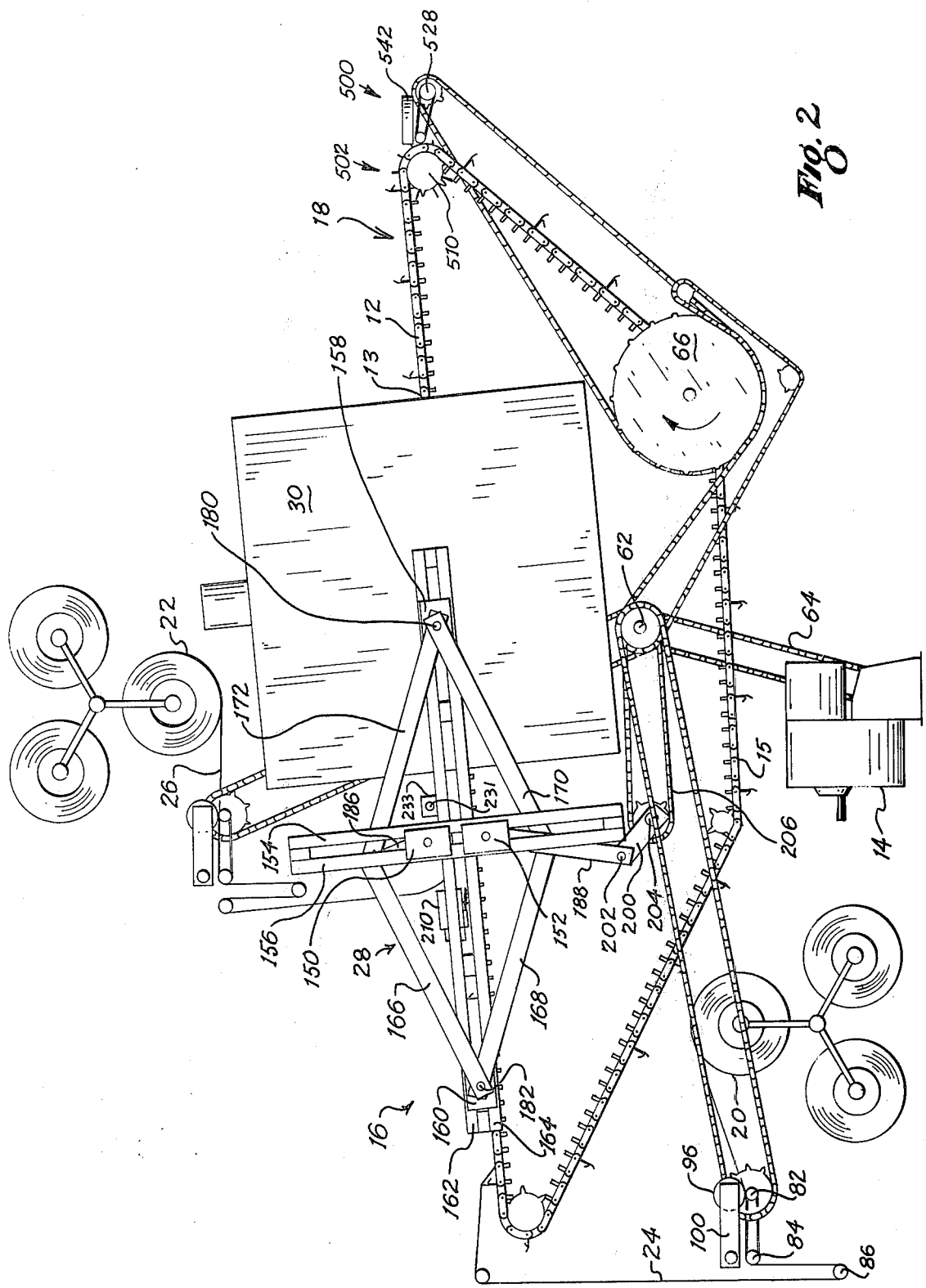
FIG. 2 is a view in side elevations of the same side of the interior working mechanisms of the embodiment of the invention illustrated in FIG. 1 also having the frame and cabinet removed for illustrating the operation of the preferred embodiment.

Referring primarily to FIGS. 1 and 2, the variable speed motor 14 is drivingly connected to a master drive shaft 62 which is journalled in suitable bearings mounted to the support frame 10 and is engaged by drive chain 64. The master drive shaft 62 in turn drives sprocket 66 through drive chain 68. Conveyer drive chains 40 and 42 are synchronously driven by sprockets 70 and 72 which, like sprocket 66, are fixed to drive shaft 74 also suitably journalled in bearings mounted on the frame 10. As will be seen, synchronism is maintained because all parts are driven by the master drive shaft 62.

The upper treatment portion 13 of the conveyer 12 is inclined to the horizontal so that it extends from the loading station 15 upwardly to the downstream, emitting end 18 of the packaging apparatus.

This inclination upwardly to the exit end 18 causes any articles loaded in the loading zones between the fences to shift or roll longitudinally toward the downhill fence until they seat against either the fence or other previously seated articles.

As illustrated in FIG. 1, it is not only possible that the fences can be spaced at different distances to accommodate different size packages but additionally it is possible that a variety of spacings be selected at a single time along the conveyer. The spacing need not necessarily be uniform, as illustrated in FIG. 1. Additionally, the central bend in the lateral connecting rod 44 and the resulting trough shape of the conveyer causes the articles to shift centrally and be tightly grouped together in the lateral direction.

Of course, in some alternative embodiments of the invention the lateral rods could be straight. For example, if trays are used or if articles which do not need the centering effect of the trough are to be packaged (such as means of paper) the straight lateral rods would be adequate. However, the longitudinal inclination may still be desirable.

The upper film supply means 22 and the lower film supply means 20 each comprises a three roll turret 76 and 78 on which three differing rolls of heat shrinkable plastic film are mounted. These may, for example, be films of different widths or strengths or other combinations suitable to the particular needs of the grocery of other institution in which the machine is operated.

Referring to the lower film feed mechanism, the selected roll of film 20 provides a ribbon of film which is threaded across a pair of rotatably mounted rolls 82 and 84 around a dancer roll 86 and upwardly on the conveyer 12. A plurality of laterally spaced, resiliently elastic, endless bands 88 extend around the rolls 82 and 84. Roll 82 is drivingly connected by drive chain 90 to a sprocket 92 which is connectable through a clutch 94 to the master drive shaft 62. The clutch 94 is solenoid operated as described below. When the clutch 94 is engaged, the master drive shaft 62 drives the endless bands 88 in a circulating path.

A rotatable, idle, pressure roll 96 is rotatably mounted to pivot arms 98 and 100 which in turn are pivotally mounted relative to the support frame 10. Preferably, the arms 98 and 100 are fixed to the shaft 102 which in turn is journalled to the frame 10. Consequently, although the pressure roll 96 may be lifted upwardly from compressing engagement of the film ribbon 24 against the elastic bands 88, it is biased downwardly by its weight to engagement with the film ribbon 24.

The dancer roll 86 is preferably mounted to the support frame 10 in a manner to permit idle rotation and radial linear translation. This is conveniently done by restraining the opposite ends of the dancer roll 86 in a pair of vertical channel members 110 and 112. The dancer roll 86 is biased downwardly by its weight and is lifted upwardly by the pulling of film along the conveyer when loaded articles anchor it to the conveyer.

A switch means is preferably also mounted to the frame in engagement with the dancer roll so as to be responsive to the position of the dancer roll along its linear vertical path. The switch means is electrically connected to the clutch 94 for effecting engagement of the cluth 94 when the dancer roll is lifted a selected distance upwardly along its linear path. Consequently, after a sufficient film demand and a selected amount of film has been drawn along the conveyer, the switch means is actuated to engage the clutch 94 and therefore feed additional film ribbon 24 from the film supply roll 20.

The preferred switch means for actuating the clutch 94 comprises a light source 114 cooperating with a photoresponsive switch 116. The source 114 and photoresponsive switch 116 are arranged at opposite ends of the dancer roll in the vertical plane of movement of the dancer roll. The connecting light beam is inclined to the dancer roll. This arrangement provides a range in which the clutch 94 is not actuated until a sufficient quantity of film has been pulled along the conveyer. The resulting advantage is that the clutch 94 is electrically deenergized with the film ribbon threading path still capable of taking up any slack which would occur due to inertia or due to continued mechanical engagement of the clutch for the remainder of a 360° clutch cycle.

Further advantageous results are obtained with an electrical time delay circuit as a part of the switch means. The delay circuit provides a time delay interval which delays the energization of the clutch 94 for a selected time interval after actuation of the switch means. This reduces the cycling rate, thus permitting film feed cycles having a longer period.

The upper film supply means 22 has an identical structure. It has an idle pressure roll 130, elastic bands 132 and dancer roll 134 as illustrated in the drawings. It is driven by drive chain 136 which drives roll 138 and is similarly actuated by an electromechanical clutch in the identical manner as the lower film feed mechanism.

It has been found that improved operation can be obtained if the drive ratios between the conveyer drive and the film feed drives are designed so that the speed of film ribbon delivery from the film supply rolls exceed the linear velocity of the conveyer means 12. It has been experimentally determined that the lower film ribbon is preferably fed at a rate in the range of 105 to 115% of the conveyer means velocity. Similarly, the upper film ribbon is preferably fed at a rate in the range of 120 to 130% of the conveyer means 12 velocity. The upper film ribbon is fed faster than the lower film ribbon because it must ordinarily be pulled up the side, across the top and down the opposite side of each grouping of produce.

The welding and severing means 28 is basically a sliding parallelogram to which a pair of welding and severing bumper members are mounted. The function of the parallelogram linking structure is to drive the opposite bumper members together through the voids which are interposed between the lateral conveyer members at the ends of the loading zones so as to weld the film ribbons moving along the conveyer and to do this in a manner in which the welding and severing means temporarily moves along with the moving conveyer.

The welding and severing means has a pair of identical sliding parallelogram means mounted on laterally opposite sides of the upper treatment region of the conveyer 12. Consequently, a description of one serves also as a description of the opposite. For example, one of the sliding parallelogram means has a first slider means including a first pair of spaced slides 150 and 152 which are constrained by fixed parallel bars 154 and 156 to reciprocation along a first linear path perpendicular to the upper treatment portion 13 of the conveyer 12. A second slider means includes a second pair of spaced slides 158 and 160 which are similarly constrained by rigid parallel bars 162 and 164 to reciprocation along a second linear path which is perpendicular to the first path. A parallelogram having four rigid sides is formed by four beams 166, 170 and 172. Their four corners are pivotally connected by pivot means such as pins 180 and 182. Horizontally and diagonally opposite pivot means 180 and 182 are mounted one to each of the second slides 158 and 160 for reciprocating translation therewith. A pair of connecting rod means 186 and 188 are each pivotally connected at one end to a different one of the other pair of diagonally opposite pivot means, that is to the vertically diagonal pivot means, and are each pivotally connected at their other end to a different one of the first slides 150 and 152.

The sliding parallelogram linking mechanism is driven by a crank 200. The crank 200 is rotatably, drivingly linked by pin 202 to the connecting rod 188 for driving the welding bumper members 190 and 192 together in synchronism with the conveyer and for driving the members into engagement through the voids of the conveyer 12 while the conveyer is moving. The crank 200 rotates about a suitably journalled horizontal axle 204 which is linked to the main drive shaft 62 by drive chain 206. The drive chain 206, however, is drivingly engaged with the main drive shaft 62 by means of an interposed electro-mechanical, single revolution clutch 207. This clutch is electrically engaged in the manner described below to permit the crank to make a single revolution during which the welding operation occurs.

As will be apparent from the description of the operation of the invention, the effective offset between the axes of the crank (which are the axis of rotation of the pin 202 and the axis of rotation of the journalled axle 204) is preferably slightly more than one-fourth the maximum distance between the welding bumper members 190 and 192 so that they make exact contact at the film ribbon.

The actual welding and severing mechanism, which contacts the film, welds it and severs it intermediate a bond, includes a pair of engageable welding bumper members 190 and 192. A different one of these welding bumper members is mounted to each of the connecting rods 186 and 188 for movement therewith.

The details of the preferred welding and severing means are illustrated in FIGS. 12 and 13. The lower bumper member is a cross beam 402 mounted at opposite ends to the sliding parallelogram linking mechanism. A support plate 404 is fixed to the cross beam 402 and is provided with a machined out notch 406 which matingly receives the lower portion of a hot knife 408. The hot knife 408 is fixed to the support plate 404 and is heated by a pair of electrical resistance heating strips 410 and 412 fixed on its opposite sides. The hot knife is blunt at its edge and severs and welds during a single contacting application against the film ribbons.

The upper bumper member 190 also has a cross beam 420 mounted at its ends to the sliding parallelogram linking mechanism. A strike plate 422 is slidingly mounted for linear reciprocation in a downwardly opening longitudinal slot formed in the cross beam 420. The strike plate 422 is downwardly biased by springs 426 and 428 but retained against falling away by a transverse pin 430 which is fixed to the cross beam 420 and passes through an elongated hole 432 through the strike plate 422. A protective, anti-stick Teflon strip 434 is adhered along the bottom edge of the strike plate 422.

The preferred mounting of the strike plate 422 permits both linear reciprocation along a generally vertical path and also permits the plate 422 to be laterally skewed or pivoted so that it always seats against the interposed film ribbons parallel to the top edge of the hot knife 408.

The linear reciprocation of the strike plate 422 permits the knife edge and the Teflon strip 434 of the strike plate 422 to remain in clamping registration as they travel together synchronously with the conveyer means 12. Without the linear reciprocation, a nonbinding engagement of the hot knife 408, the film ribbons and the strike plate 422 could only occur at a momentary contact point.

FIG. 8 illustrates a cam follower operated actuating switch 210 which, when actuated, electrically operates the electro-mechanical single revolution clutch 207 permitting the crank 200 to make one rotation of 360 degrees. Consequently, when the cam follower operated switch 210 is actuated, the welding and severing means 28 performs one welding cycle of operation.

Each of the fence brackets, such as bracket 54 has an overbent top surface, such as top surface 230, which forms a cam operably aligned with the cam follower 232 of the switch 210. As the conveyer moves along beneath the switch 210, the cam surface 230 engages the cam follower 232 and operates the switch 210. The switch 210 actuates the film welding and severing means for one complete cycle of operation to provide one weld. The cam operated switch 210 is, as shown in FIG. 2, positioned upstream of the place at which the welding bumper members 190 and 192 come together. Consequently, operation of the switch 210 causes a weld to occur in the void immediately behind each lateral fence.

In a preferred modification of the basic embodiment, a second photoelectric switch comprises a light source 231 and a photoresponsive switch 233 is positioned immediately downstream of the cam operated switch 210 to detect the presence or absence of produce articles on the conveyer means 12. This second switch is electrically connected in the circuit with the cam follower operated switch 210 and the weld cycling clutch 207. It operates to disable operation of the welding and severing means when no articles are present for packaging. It enables the welding and severing means when such articles are present.

The heat shrink means 30 of the preferred embodiment of the invention comprises an enclosure 300 which surrounds a part of the upper treatment portion 13 of the conveyer means 12. It has an inlet opening 310 covered by a flexibly movable heat retaining curtain 312 comprising a series of flexible strips over the entrance opening 310. It also has an exit opening 314 similarly protected by a heat retaining curtain 316. These entrance and exit openings 310 and 314 are adapted for the passage of the conveyer and articles thereon through the enclosure 300. A heating means, which is preferably a convection type heater 330 provided with suitable heat exchange fins, is mounted in the enclosure and positioned below the treatment portion of the conveyer means 12. If desired, a partial heat barrier or shield 513 may be formed by a metal sheet and horizontally mounted below the conveyer means 12 and above and spaced from the heater 330. An impeller, such as a fan blade 332 driven by an electric motor 334 is mounted above and spaced from the upper treatment portion of the conveyer means 12 for circulating heated air within the enclosure 300.

Finally, it has been found that the use of a conveyer means having a longitudinal, trough shape, the use of spaced lateral fences for forming loading zones and especially the use of both result in the need for a substantial gap between the conveyer surface on which the packages rest at the discharge end of the conveyer and any other device which receives the packages from the conveyer. The gap is necessitated by the need to prevent any receiving apparatus from interfering with the movement of the conveyer means or the lateral fences mounted thereto.

Therefore, it is advantageous to provide a discharge assistant mechanism 500 at the discharge end 18 of the conveyer means 12. This discharge assistant means 500 comprises a package discharge lift 502 and an auxiliary discharge conveyer 504. Generally, the discharge lift comprises a body which is rotatably mounted to the frame at the downstream end of and beneath the upper treatment portion of the conveyer means 12. This rotatable body is synchronously and drivingly connected to the conveyer means and has a plurality of radially outwardly extending arms which are in dynamic registration with and extend outwardly through the spaced voids in the conveyer means.

Figure 14:
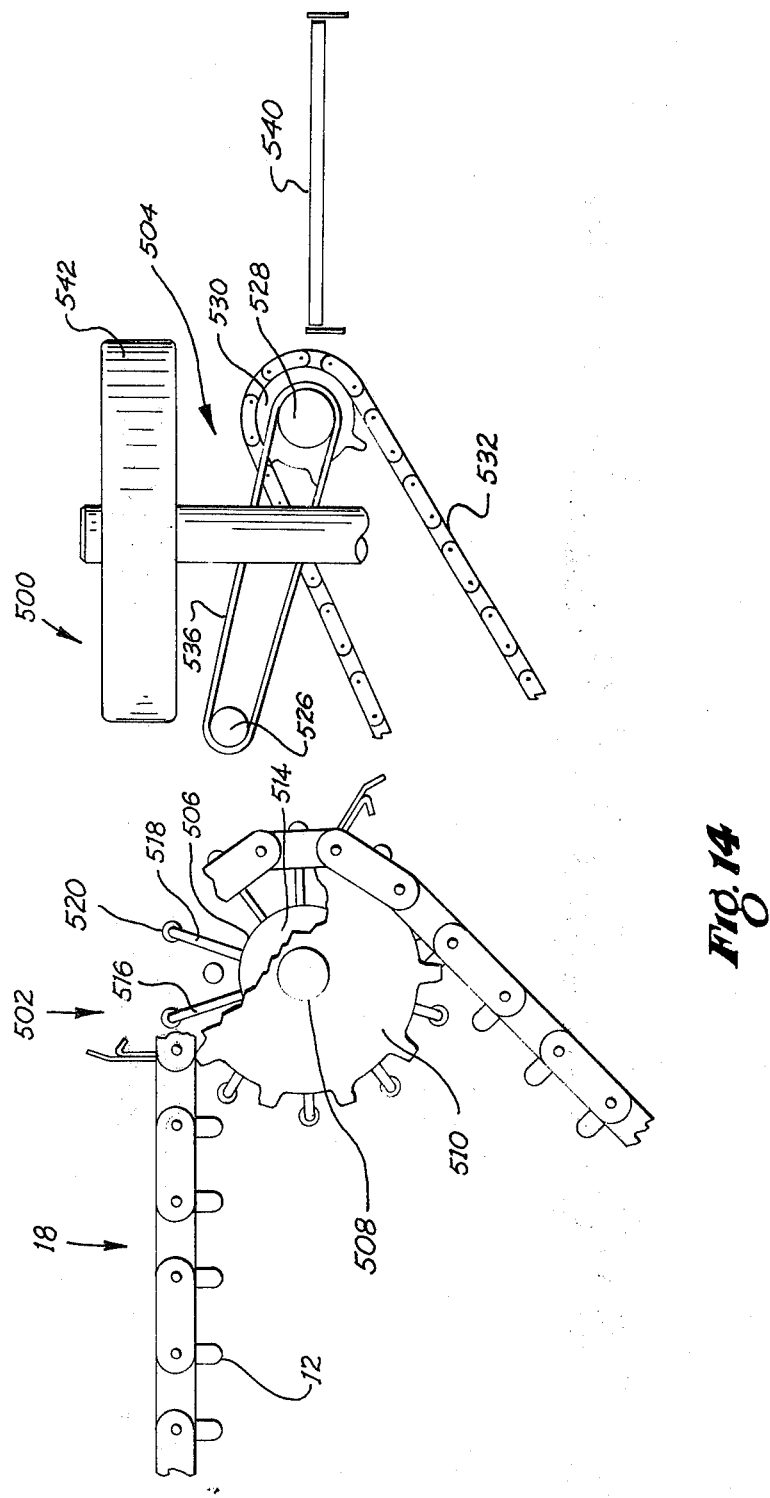
FIG. 14 is a view in side elevation illustrating the detail of the package discharge mechanism of the preferred embodiment of the invention.

The preferred rotatable body 506 is illustrated in FIG. 14 and is fixed to the sprocket side 508 which in turn is rotatably journalled to the support frame and fixed to the conveyer chain sprockets 510 and 512. This assures synchronous driving of the rotatable body 506. Preferably, the rotatable body 506 comprises a pair of laterally spaced rollers such as collar 514 which is fixed to the sprocket axle 508 by a suitably conventional set screw means.

Fixed to and extending radially outwardly from the rotatable body 506 are a plurality of radial legs such as legs 516 and 518. These legs extending from the spaced collars, such as collar 514, are formed at their outermost end with a centrally directed right angle bend or elbow. Laterally opposite legs extending from the spaced collars are joined by a plurality of lateral rods such as rod 520 which conveniently are tubular rods having an inside diameter mating with the outside diameter of the radially extending legs. Each of these lateral rods extend generally parallel to the axis of rotation of the sprocket axle 508.

Of course, prior to the permanent positioning of the spaced collars on the sprocket axle 508, the radially extending legs are adjusted for registration with the voids in the conveyer means 12.

The auxiliary discharge conveyer 504 comprises a pair of substantially parallel laterally oriented rolls 526 and 528 journalled to the support frame 10 and having one of the rolls, such as the roll 528, drivingly connected to a drive means. Preferably, the roll 528 is connected by drive sprockets 520 and drive chain 532 to a larger sprocket 534 fixed to the drive shaft 74 at the end opposite the sprockets 66.

A plurality of endless, resiliently elastic, laterally spaced bands such as band 536, which are similar to o-rings, surround and engage the rolls 526 and 528. Preferably, the rolls are provided with mating annular grooves in which the endless bands seat and which prevent the bands from creeping or drifting laterally. Driving of the auxiliary conveyer 504 transports packages received from the conveyer means 12 to a suitable receiving mechanism such as for example a transport conveyer 540 which transports the packages transversely away from the auxiliary discharge conveyer 504.

Advantageously, a wheel 542 should be rotatably mounted to the support frame for rotation about a generally vertical axis. The wheel is positioned to extend above and overlap the transfer conveyer so that packages released by the auxiliary conveyer 504 are centered on the transfer conveyer 540. Preferably, the wheel is driven at an angular velocity which moves the outer circumference of the wheel at a rate faster than the linear velocity of the transfer conveyer 540. For example, the preferred velocity of the wheel may be 150% of the linear velocity of the transfer conveyer 540.

OPERATION

Prior to the loading of the machine with produce articles, the film ribbons 24 and 26 are threaded through the film supply means in the manner described above and positioned on the conveyer as illustrated in FIG. 1. The upper and lower film ribbons 24 and 26 are welded together at their ends to form a seam. With the drive motor 14 energized and the conveyer means 12 in continuous operation, but with no produce articles loaded in the loading zones, the conveyer means 12 will simply slip under the loosely resting film ribbons so that no film will be pulled from the film supply means. The photoresponsive switch 233 will detect the absence of articles for packaging and consequently the welding and severing means 28 will be disabled. The machine can continue indefinitely in this state awaiting the loading of articles for packaging into the loading zones at the loading station 16 of the conveyer means 12.

When an operator sets articles in the loading zones, such as grapefruits 400 illustrated in FIG. 1, these articles will anchor the film ribbons to the conveyer so that movement of the conveyer will now pull film from the film supply means. Consequently, only loading is needed to initiate the packaging operation of the machine.

The articles loaded into the loading zones of the machine between the lateral fences will roll or gravitate toward the center of the machine because of the longitudinal trough shape of the conveyer. Additionally, because the entire top or treatment portion 13 of the conveyer is inclined to the horizontal, the articles will tend also to roll or gravitate toward the lowermost fence bordering each loading zone.

If the loading zone is entirely filled with articles, then the upper film ribbon 26 will be pulled upwardly over the front and the top of the grouping of articles as they pass beneath the upper welding bumper member 190.

Alternatively, if the loading zone is not entirely filled, then the lower film ribbon 24 will be placed upwardly by tension on the upper film ribbon 26 around the grouping of articles until it is pulled tight. Subsequently, the upper film ribbon 26 will be fed to entirely surround the grouping of articles with heat shrinkable plastic film.

As explained above the entire ratios for driving the film feed cause film to be fed at a greater rate than the linear velocity of the conveyer. This is done in order to approximately match the film feed rate to the film demand so that film is fed with a minimum clutch switching rate. Thus, it is desirable that the film feed clutches, such as clutch 94, be operated as continuously as possible with a minimum number of transitions to engaged or disengaged states.

The feed rate for the lower film ribbon is greater than the linear conveyer velocity substantially only by an amount necessary to drape film over the lateral fences. In designing the machine, an average fence spacing can be assumed for design purposes. Alternatively, an adjustable speed mechanism can be incorporated so that lower film delivery rate can be increased as fence spacing is decreased.

The feed rate for the upper film ribbon is greater than the linear velocity of the conveyer by an amount necessary to drape the film over the articles to be packaged. Consequently, a greater feed rate is demanded for accommodating longer size groupings of articles. As with the lower film supply, an average package size can be assumed for design purposes. Alternatively, a variable speed mechanism can be incorporated to permit upper film delivery rate to be increased as package size is increased.

When a trailing fence bordering a loading zone, for example, the trailing fence 402 trailing the loading zone in which the articles 404 are positioned, passes beneath the cam operated switch 210, the clutch 207 is actuated to permit the crank 200 to make one 360° revolution. This one cycle in turn causes the welding bumper members 190 and 192 to come together through the void which is immediately trailing the fence 402. The welding bumper members 190 and 192 weld the ribbons 24 and 26 and sever them intermediate the weld.

Figure 3:
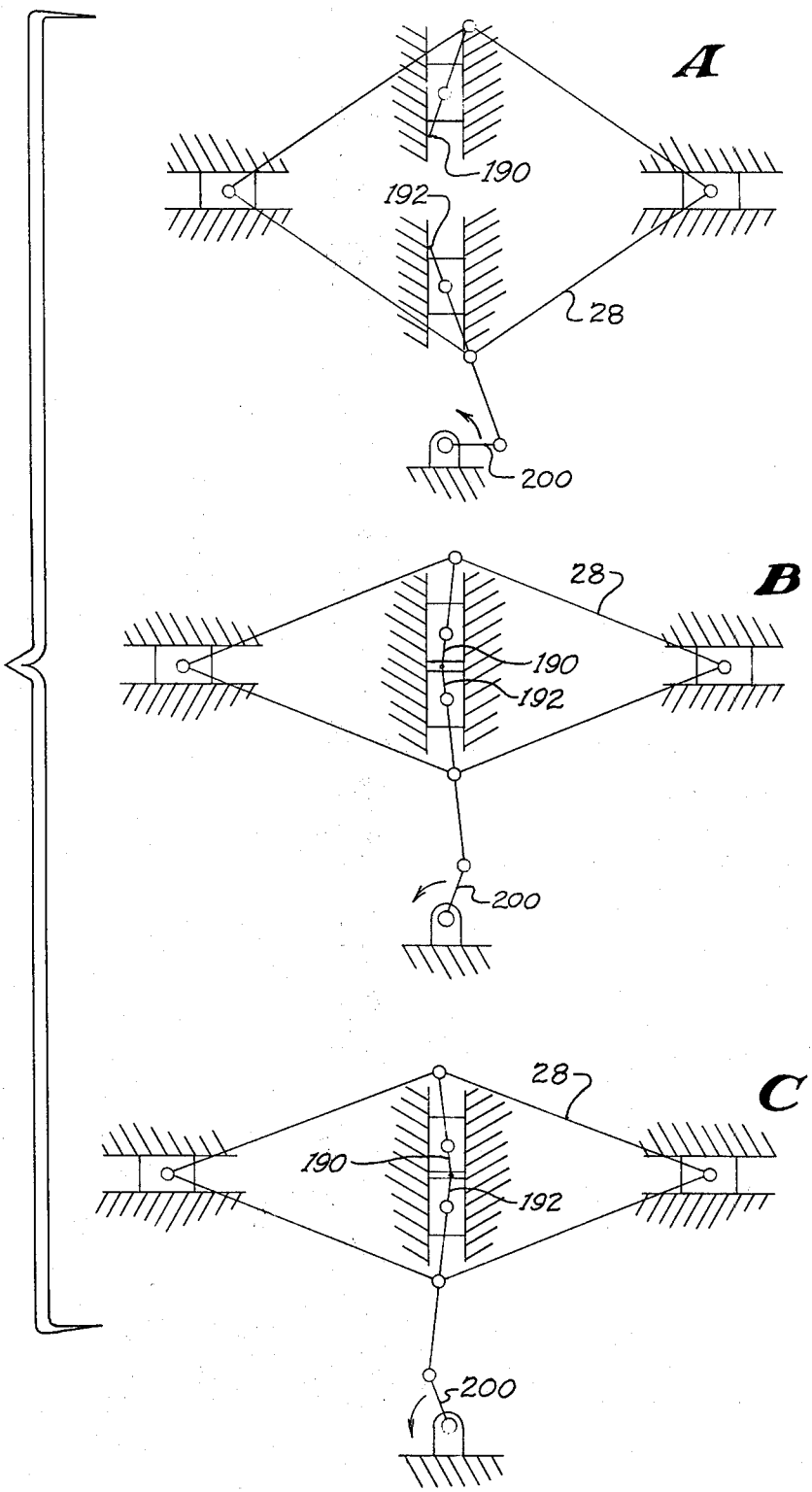
FIG. 3 is a series of diagrammatic views illustrating the operation of the welding and severing means of the preferred embodiment of the invention.

FIG. 3 illustrates the operation of the welding and severing means 28. Operation begins with the sliding parallelogram linking mechanism in a position having its crank 200 extended vertically downwardly. Actuation of the cam operated switch 210 first brings the weld mechanism 28 to the position diagrammatically illustrated in FIG. 3A. As the crank 200 rotates further to the position illustrated in FIG. 3B the welding bumper members 190 and 192 are driven together into contact as illustrated in FIG. 3B.

Further rotation of the crank 200 maintains these welding bumper members 190 and 192 in clamping contact with the intermediate film ribbons and moves them along with the cooperating void in the direction of movement of the conveyer through which they extend. During the longitudinal travel of the welding bumper members 190 and 192 the welding and severing operation occurs until the members 190 and 192 arrive at the position illustrated in FIG. 3C. Clamping relation is maintained as the upper strike plate, described above, slides and/or pivots in its slot.

Further rotation of the crank 200 withdraws the welding bumper members 190 and 192 from the void in the conveyer and returns them to the starting position with the crank 200 oriented vertically downwardly. There is, consequently, no need to intermittently stop the conveyer movement in order to permit a weld operation to occur. Instead, the welding bumper members 190 and 192 move in synchronism with the conveyer and the film ribbons for a brief interval.

Of course, this welding cycle operation is identically repeated for each grouping of articles positioned in the loading zones. Because the weld mechanism is tripped by the lateral fences, the machine automatically responds to a variety of fence spacings. There is therefore no need to change or make adjustments in the welding and severing means in order to accommodate different groupings of differing sizes.

Additionally, it can be appreciated from the operation of the machine that articles may be packaged with or without relatively rapid plastic or other trays often required in packaging similar articles. The entire tray and its contents can be loading into the loading zone and will easily be wrapped by plastic film.

A variety of welding bumper members have been illustrated in the prior art which can be utilized for the welding bumper members 190 and 192. The preferred members are illustrated in FIGS. 12 and 13 and described above. Alternatively, a single, electrically heated wire may be suspended in spaced relationship above but mounted to the lower bumper member 192 and a passive upper member 190, which seats the film ribbons against the heated wire, can form the upper bumper member.

The welding and severing mechanism 28 is positioned so that the upper welding bumper member 190 contacts the upper film ribbon 26, drives it against the lower film ribbon 24 and then drives both ribbons against the hot knife for welding and severing. This prevents premature severing of the film ribbons.

After the weld operation, the loosely enveloped grouping of articles continue along the conveyer means 12 into the heat shrink means 30. The interior of the heat shrink means 30 is maintained at a temperature approximately in the range of 275° to 300°F. for PVC film for example. Heat is supplied into the interior by the electrical heaters 330. The impeller 332 circulates the heated air within the heat shrink means 30 and turbulently circulates it about each package passing through the heat shrink means 30. This turbulent circulation assures that the entire film surface is very quickly and uniformly heated. The finished package is both neat in appearance and tightly and protectively retains the articles in a compact grouping. Small openings are desirably formed at the laterally opposite ends of the package to permit continued respiration of packaged fruits and vegetables.

Immediately, after the welding and severing means releases the welded and severed ribbons, the dancer roll in the upper film feed mechanism falls by gravity along its vertical path to withdraw some of the upper film ribbon. This fall of the upper dancer roll pulls the end of the lower film ribbon and the adjoining seam up and over the downstream end of the next grouping of articles as it approaches the welding and severing position. There is therefore, no "tail" or excess unfilled film on the downstream end of the next unshrunk package.

Alternatively, if there are no subsequent packages, the upper film ribbon withdraws the seam from the region of the welding and severing means and drapes the adjoined ends of the film ribbons along a smooth, continuous arcuate path.

Figure 4:
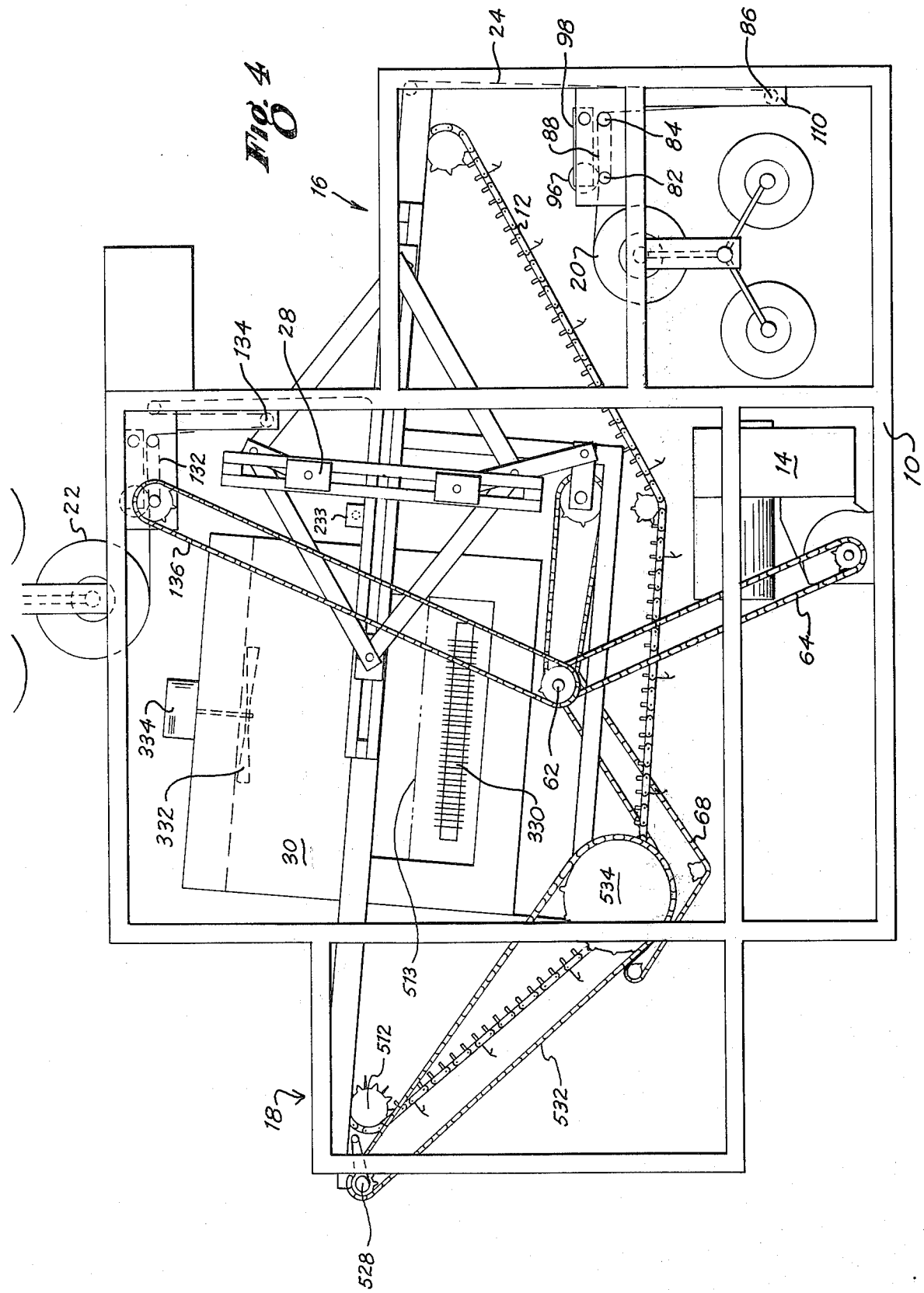
FIG. 4 is a view in side elevation of the opposite side of the preferred embodiment of the invention illustrated in FIG. 1 with the cabinet panels removed but with the frame members illustrated.
Figure 5:
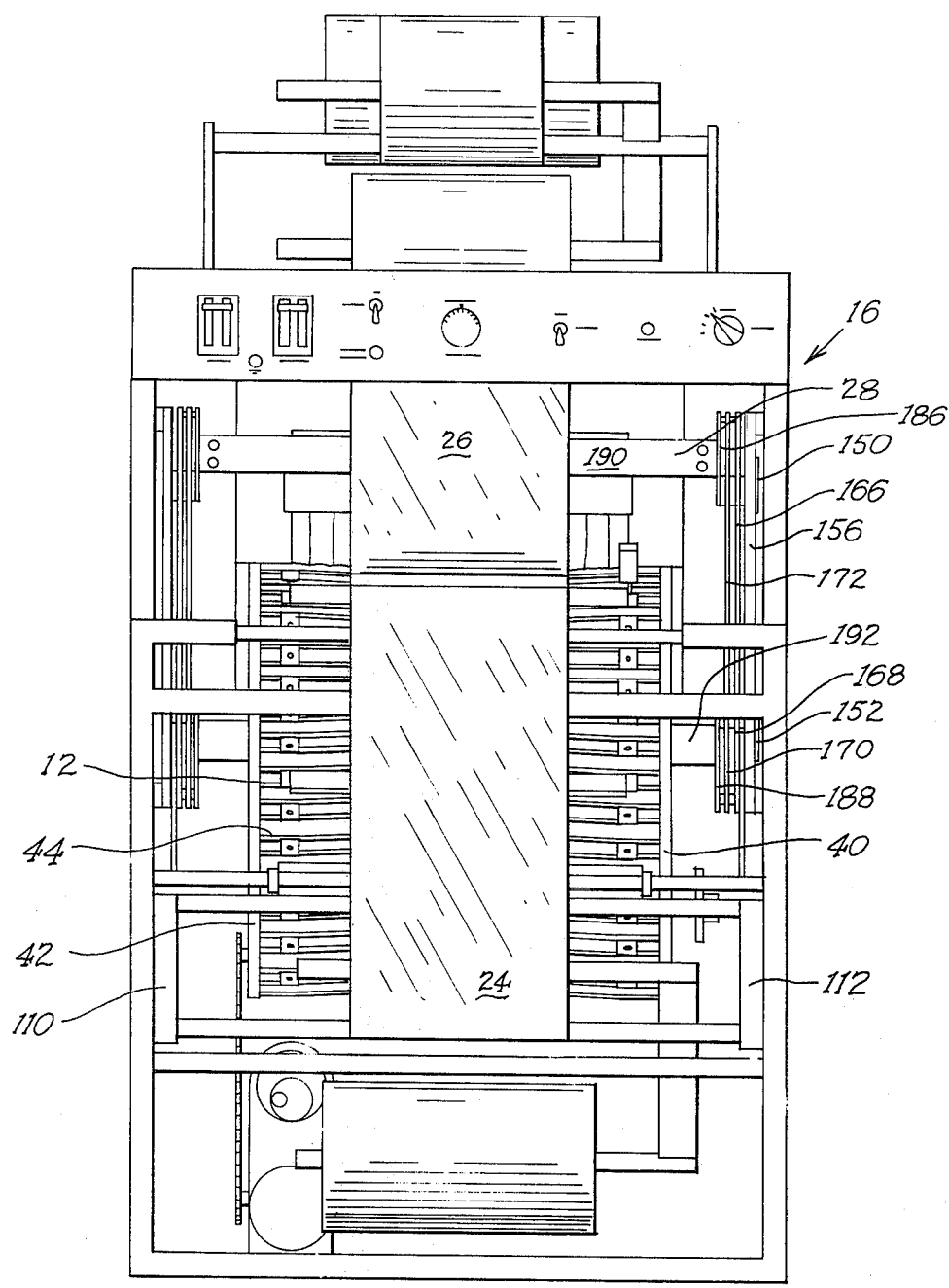
FIG. 5 is a front elevational view of the preferred embodiment of the invention illustrated in FIG. 1.
Figure 6:
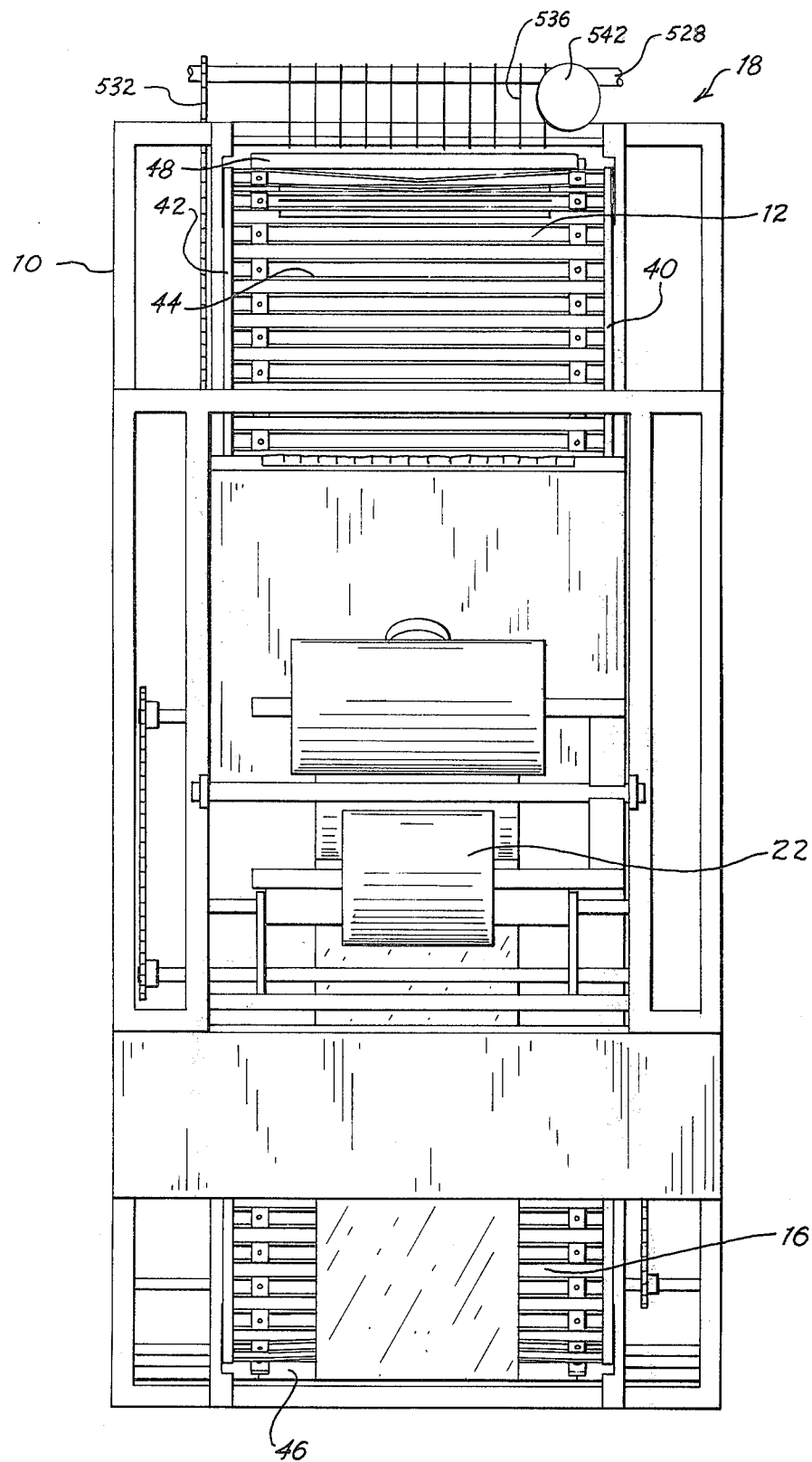
FIG. 6 is a plan view of the top of the preferred embodiment of the invention illustrated in FIG. 1.
Figure 7:
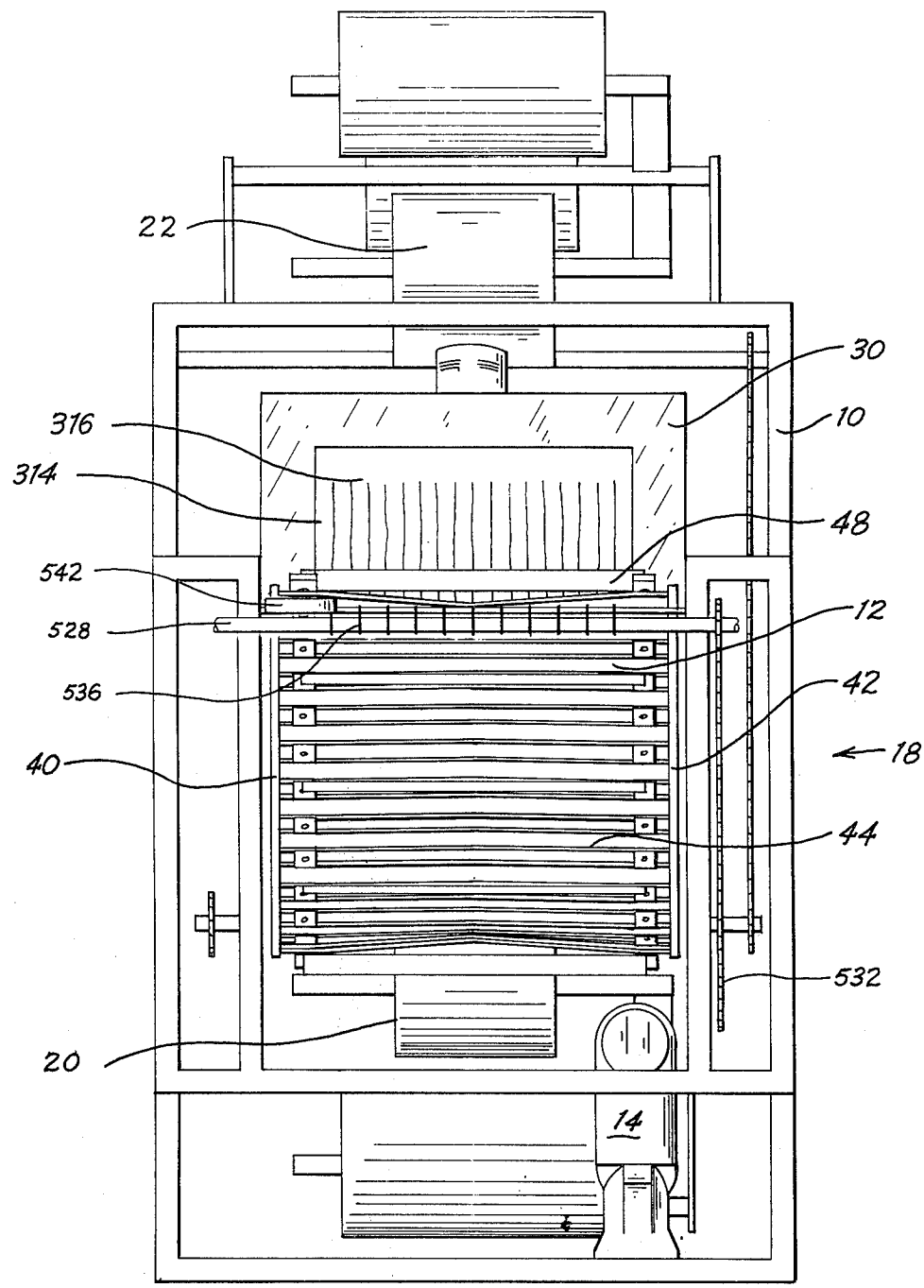
FIG. 7 is a rear elevational view of the preferred embodiment of the invention illustrated in FIG. 1.

After being shrunk, the complete package then exits from the heat shrink means 30 through the exit opening 316 and passes from the exit end 18 of the packaging machine onto any suitable receiving unit. For example, another transfer conveyer 540 as illustrated in FIG. 4, may be cooperatively positioned at the exit end 18 to move the peripheral articles for further processing or storage.

When the packages reach the discharge lift 502 they are lifted upwardly by the cross members, such as cross rod 520. This initial upward tilt and lifting delivers the packages outwardly onto the auxiliary conveyer 504 and prevents them from dropping downwardly between the conveyer means 12 and the auxiliary conveyer roll 526.

The packages are then conveyed along the auxiliary conveyer 504 until they rest upon the perpendicularly moving transfer conveyer 540. The rotating wheel 542 which is both laterally offset from the auxiliary conveyer 504 and overlapping the transfer conveyer 540 forces the packages to the center of the transfer conveyer 500.

One advantage of the invention is that the loading zone may easily be made into a variety of sizes. The minimum size for a loading zone is determined primarily by the time required to completely cycle the welding and severing means 28. The detachable fences may be places relatively close together as long as a sufficient spacing is maintainaed to permit the welding and and severing means 28 to complete its cycle prior to the time it is again actuated for the beginning of another cycle.

Another advantage of the above machine is that once operation is begun, the machine is subsequently then operated solely by the placement of articles in the loading zone. Consequently, if an operator stops loading the machine, there is no need to turn off the machine. Instead the machine continues running without consuming shrinkable film and without clogging or any other malfunction. The welding and severing means is disabled by the receipt of light at the photodetector 233. Furthermore, if an operator fails to fill a loading zone between the lateral fences, the machine continues operating by merely pulling the excess lower film ribbon over the top of the next package.

The use of a single variable speed motor 14 for driving the entire mechanism permits synchronous reduction or increase in speed to accommodate varying loading speeds and varying article sizes.

It is to be understood that while the detailed drawing and specific examples given describe preferred embodiments of the invention they are for the purposes of illustration only, that the apparatus of the invention is not limited to the precise details and conditions disclosed and that various changes may be made therein without departing from the spirit of the invention which is defined by the following claims.

We claim:

1. An article packaging machine comprising:
   a. a support frame;
   b. a motor driven, endless, article conveyer means mounted to the support frame including an upper treatment portion and a lower return portion and having an article loading station and a package emitting end downstream thereof, said conveyer comprising a pair of spaced, parallel, synchronously driven longitudinal drive chains and a plurality of lateral rods joining said chains at spaced intervals along said conveyer and wherein each of said rods is bent inwardly of said conveyer to form a centrally tapering longitudinal trough along said conveyer, said trough formed by side walls which are continuously sloped to substantially the center of said trough said conveyer including a plurality of outwardly extending, lateral fences spaced along said conveyer to form loading zones and wherein said upper treatment portion of said conveyer is inclined to the horizontal upwardly from said loading station to said downstream emitting end;
   c. heat shrinkable, packaging film supply means mounted to the support frame and including a lower film supply roll and a lower film feed mechanism for feeding a lower film ribbon onto the end of the conveyer in a downstream direction and an upper film supply roll and upper feed mechanism for feeding an upper film ribbon downwardly onto the lower film ribbon downstream of said loading station;
   d. a film welding and severing means mounted to said frame adjacent said upper treatment portion of said conveyer and downstream of said upper film ribbon for laterally bonding said upper and lower film ribbons and for laterally severing said ribbons intermediate a bond; and
   e. heat shrink means mounted to said frame adjacent the upper treatment portion of said conveyer downstream of said welding and severing means for heat shrinking said film around said articles.

2. An article packaging machine comprising:
 a. a support frame;
 b. a motor driven, endless, article conveyer means mounted to the support frame including an upper treatment portion and a lower return portion and having an article loading station and a package emitting end downstream thereof, said conveyer comprising a pair of spaced, parallel, synchronously driven longitudinal drive chains and a plurality of lateral rods joining said chains at spaced intervals along said conveyer and wherein each of said rods is bent inwardly of said conveyer to form a centrally tapering longitudinal trough along said conveyer, said trough formed by side walls which are continuously sloped to substantially the center of said trough, said conveyer including a plurality of outwardly extending, lateral fences spaced along said conveyer to form loading zones and wherein said upper treatment portion of said conveyer is inclined to the horizontal upwardly from said loading station to said downstream emitting end wherein each of said lateral fences comprises a relatively rigid fence member having an angle bracket fixed to each end thereof and extending outwardly therefrom, each of said angle brackets having a first manually operable fastener member extending therefrom, and wherein a plurality of laterally aligned second fastener members are fixed near opposite ends of said rods spaced along said conveyer, matingly alignable with said first fastener members;
 c. heat shrinkable, packaging film supply means mounted to the support frame and including a lower film supply roll and a lower film feed mechanism for feeding a lower film ribbon onto the end of the conveyer in a downstream direction and an upper film supply roll and upper feed mechanism for feeding an upper film ribbon downwardly onto the lower film ribbon downstream of said loading station;
 d. a film welding and severing means mounted to said frame adjacent said upper treatment portion of said conveyer and downstream of said upper film ribbon for laterally bonding said upper and lower film ribbons and for laterally severing said ribbons intermediate a bond; and
 e. heat shrink means mounted to said frame adjacent the upper treatment portion of said conveyer downstream of said welding and severing means for heat shrinking said film around said articles.

3. An article packaging machine comprising:
 a. a support frame;
 b. a motor driven, endless, article conveyer means mounted to the support frame including an upper treatment portion and a lower return portion and having an article loading station and a package emitting end downstream thereof said conveyer comprising a plurality of longitudinally spaced discrete conveyer members having interposed voids;
 c. heat shrinkable, packaging film supply means mounted to the support frame and including a lower film supply roll and lower film feed mechanism for feeding a lower film ribbon onto the end of the conveyer in a downstream direction and an upper film supply roll and upper feed mechanism for feeding an upper film ribbon downwardly onto the lower film ribbon downstream of said loading station;
 d. a film welding and severing means mounted to said frame adjacent said upper treatment portion of said conveyer and downstream of said upper film ribbon for laterally bonding said upper and lower film ribbons and for laterally severing said ribbon intermediate a bond wherein said welding and severing means comprises:
  1. a first slider means including a first pair of spaced slides constrained to reciprocation along a first path transverse to the upper treatment portion of said conveyer means;
  2. a second slider means including a second pair of spaced slides constrained to reciprocation along a second path transverse to said first path;
  3. a parallelogram means having sides pivotally connected at the corners thereof by pivot means and having the pivot means of a one pair of diagonally opposite corners mounted one to each of said second slider means for reciprocating translation therewith;
  4. a pair of connecting rod means each pivotally connected at one to a different one of the other pair of diagonally opposite pivot means and pivotally connected at the other end to a different one of said first slider means;
  5. a film welding and severing mechanism including a pair of engageable welding and bumper members having a different one of said members mounted to each of said connecting rod means for movement therewith; and
  6. a drive means including a crank drivingly engaging one of said connecting rod means for driving said members in synchronism with said conveyer means and for driving said members into engagement through said voids while said conveyer means is operating; and
 e. heat shrink means mounted to said frame adjacent the upper treatment portion of said conveyer downstream of said welding and severing means for heat shrinking said film around said articles.

4. A machine according to claim 3 wherein said first path is linear and perpendicular to said upper treatment portion of said conveyer and said second path is linear and perpendicular to said first path; wherein both of said connecting rod means extends inwardly of said parallelogram and one of said connecting rod means also extends outwardly of said parallelogram into driving engagement with said crank.

5. A machine according to claim 4 wherein the effective offset between the pivot axis of said crank is one fourth the maximum distance between said welding bumper members.

6. A machine according to claim 5 wherein said conveyer includes a plurality of outwardly extending lateral fences removably mounted at spaced, selected positions along said conveyer means to form loading zones of selected sizes and wherein said welding means includes a cam follower operated actuating means mounted to be actuable by said lateral fences for actuating said crank means for one rotational cycle of operation.

7. An article packaging machine comprising:
 a. a support frame;

b. a motor driven, endless, article conveyer means mounted to the support frame including an upper treatment portion and a lower return portion and having an article loading station and a package emitting end downstream thereof, said conveyer comprising a pair of spaced, parallel, synchronously driven longitudinal drive chains and a plurality of lateral rods joining said chains at spaced intervals along said conveyer and wherein each of said rods is bent inwardly of said conveyer to form a centrally tapering longitudinal trough along said conveyer, said trough formed by side walls which are continuously sloped to substantially the center of said trough;

c. heat shrinkable, packaging film supply means mounted to the support frame and including a lower film supply roll and a lower film feed mechanism for feeding a lower film ribbon onto the end of the conveyer in a downstream direction and an upper film supply roll and upper feed mechanism for feeding an upper film ribbon downwardly onto the lower film ribbon downstream of said loading station;

d. a film welding and severing means mounted to said frame adjacent said upper treatment portion of said conveyer and downstream of said upper film ribbon for laterally bonding said upper and lower film ribbons and for laterally severing said ribbons intermediate a bond; and e. heat shrink means mounted to said frame adjacent the upper treatment portion of said conveyer downstream of said welding and severing means for heat shrinking said film around said articles wherein said conveyer includes a plurality of outwardly extending lateral fences removably mounted at spaced, selected positions along said conveyer means to form loading zones of selected sizes and wherein said welding means includes a cam follower operated actuating means mounted to be actuable by said fences for actuating said film welding and severing means for one cycle of operation.

8. A machine according to claim 7 wherein the cam follower of said actuating means is positioned upstream of said welding and severing means for registration with the upstream fence of the loading zone which is in operable alignment with the welding and severing means.

9. An article packaging machine comprising:
a. a support frame;
b. a motor driven, endless, article conveyer means having a plurality of regularly spaced voids therein, said conveyer means mounted to the support frame, including an upper treatment portion and a lower return portion and having an article loading station and a package emitting end downstream thereof;

c. heat shrinkable, packaging film supply means mounted to the support frame and including a lower film supply roll and lower film feed mechanism for feeding a lower film ribbon onto the end of the conveyer in a downstream direction and an upper film supply roll and upper feed mechanism for feeding an upper film ribbon downwardly onto the lower film ribbon downstream of said loading station;

d. a film welding and severing means mounted to said frame adjacent said upper treatment portion of said conveyer and downstream of said upper film ribbon for laterally bonding said upper and lower film ribbons and for laterally severing said ribbons intermediate a bond;

e. heat shrink means mounted to said frame adjacent the upper treatment portion of said conveyer downstream of said welding and severing means for heat shrinking said film around said articles;

f. a package discharge lift comprising a body rotatably mounted to said frame at the downstream end of and beneath the upper treatment portion of said conveyer means and synchronously, drivingly connected to said conveyer means, said body having a plurality of radially outwardly extending arms in dynamic registration with and extending outwardly through the voids of said conveyer means;

g. an auxiliary discharge conveyer mounted at the downstream end of said conveyer means for receiving packages therefrom, said discharge conveyer comprising: (1) a pair of substantially parallel, laterally oriented rolls journalled to said frame, one of said rolls being drivingly connected to a drive means; and (2) a plurality of endless, resiliently elastic, laterally spaced bands surrounding and engaging said rolls; and h. a transfer conveyer mounted to receive packages from said discharge conveyer and to transport them laterally away from said discharge conveyer, wherein the improvement comprises a wheel mounted to said frame for rotation about a generally vertical axis, said wheel extending above in overlapping arrangement to said transfer conveyer for centering packages on said transfer conveyer.

10. A machine according to claim 9 wherein the wheel is driven at a rate exceeding the linear velocity of the transfer conveyer.

* * * * *